(12) United States Patent
Hatakeyama et al.

(10) Patent No.: US 11,480,448 B2
(45) Date of Patent: Oct. 25, 2022

(54) ROTATION DETECTION APPARATUS, OPERATION APPARATUS, LENS APPARATUS AND IMAGE PICKUP APPARATUS

(71) Applicant: CANON KABUSHIKI KAISHA, Tokyo (JP)

(72) Inventors: Yasuhiro Hatakeyama, Utsunomiya (JP); Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 565 days.

(21) Appl. No.: 16/556,318

(22) Filed: Aug. 30, 2019

(65) Prior Publication Data

US 2020/0080869 A1 Mar. 12, 2020

(30) Foreign Application Priority Data

Sep. 7, 2018 (JP) .............................. JP2018-167861
Nov. 28, 2018 (JP) .............................. JP2018-221833

(51) Int. Cl.
*G01D 5/347* (2006.01)
*G03B 17/14* (2021.01)
*G02B 7/09* (2021.01)

(52) U.S. Cl.
CPC ....... *G01D 5/34707* (2013.01); *G01D 5/3473* (2013.01); *G02B 7/09* (2013.01); *G03B 17/14* (2013.01)

(58) Field of Classification Search
CPC .......... G03B 17/12; G03B 17/14; G02B 7/04; G02B 7/09; G01D 5/3473; G01D 5/34715; G01D 5/34707
See application file for complete search history.

(56) References Cited

U.S. PATENT DOCUMENTS

| | | | |
|---|---|---|---|
| 7,358,865 B2 * | 4/2008 | Igaki ........................ | G01D 5/38 250/233 |
| 9,307,125 B2 | 4/2016 | Katsumata | |
| 9,602,706 B2 | 3/2017 | Osada | |
| 2008/0265136 A1 * | 10/2008 | Tanaka ............... | G01D 5/34746 250/206.1 |
| 2020/0080869 A1 * | 3/2020 | Hatakeyama ............ | G02B 7/09 |

FOREIGN PATENT DOCUMENTS

JP 2016110070 A 6/2016

\* cited by examiner

*Primary Examiner* — John R Lee
(74) *Attorney, Agent, or Firm* — Rossi, Kimms & McDowell LLP

(57) ABSTRACT

The rotation detection apparatus including an annular member, a scale member having flexibility and being fixed to a circumferential portion of the annular member, and a detector facing the scale member and configured to detect relative rotation between the scale member and the detector. The circumferential portion of the annular member includes multiple convex portions and multiple concave portions along a circumferential direction of the annular member. The scale member is in contact with the multiple convex portions. Both ends, in the circumferential direction, of the scale member are fixed to the circumferential portion.

25 Claims, 12 Drawing Sheets

ROTATION DETECTION APPARATUS, OPERATION APPARATUS, LENS APPARATUS AND IMAGE PICKUP APPARATUS

BACKGROUND OF THE INVENTION

Field of the Invention

The present invention relates to a rotation detection apparatus, an operation apparatus, a lens apparatus and an image pickup apparatus.

Description of the Related Art

Optical apparatuses such as cameras or interchangeable lenses have a function of detecting rotation of an operation ring and of causing the optical apparatuses to perform various operations. Some operation rings are endlessly rotatable, and therefore a rotation detection device capable of detecting such endless rotation is required. Some rotation detection devices include a scale provided on an inner circumference of the operation ring and a photo sensor relatively rotatable to the scale, and output from the photo sensor a signal corresponding to a periodic pattern provided on the scale. Japanese Patent Laid-Open No. 2016-110070 discloses an optical apparatus in which a sheet having multiple holes is attached to an inner circumferential surface of an operation ring and a scale is formed by using a difference between a reflectance of the sheet and a reflectance of the inner circumferential surface of the operation ring. Further, Japanese Patent Laid-Open No. 2016-110070 also discloses that the inner circumferential surface of the operation ring exposed from a gap between both ends of the sheet can also be used as part of the scale.

However, as disclosed in Japanese Patent Laid-Open No. 2016-110070, in order to attach the sheet to the inner circumferential surface of the operation ring without floating therefrom, it is necessary to attach the sheet with a tensile force. In this case, a variation in tensile force causes a variation in circumferential length of the scale and an error in circumferential width of the gap between the both ends of the sheet. These variation and error decrease rotation detection accuracy. It is possible to adjust the length of the scale and the width of the gap between the both ends of the scale by peeling the sheet off from the inner circumferential surface of the operation ring and re-attaching the sheet thereto. However, such work takes time. Furthermore, when linear expansion coefficients of the operation ring and the sheet attached thereto have a difference therebetween, a temperature change may cause a change in width of the gap and peeling of the sheet.

SUMMARY OF THE INVENTION

An aspect of embodiments provides, for example, a rotation detection apparatus beneficial in a detection precision thereof.

The present invention provides as an aspect thereof a rotation detection apparatus including an annular member, a scale member having flexibility and being fixed to a circumferential portion of the annular member, and a detector facing the scale member and configured to detect relative rotation between the scale member and the detector. The circumferential portion of the annular member includes multiple convex portions and multiple concave portions along a circumferential direction of the annular member. The scale member is in contact with the multiple convex portions. Both ends, in the circumferential direction, of the scale member are fixed to the circumferential portion.

The present invention provides as another aspect thereof an operation apparatus including an operation member to be operated rotationally, a rotation detection apparatus configured to detect rotation of the operation member, and a controller configured to control an operation based on the detected rotation. The rotation detection apparatus includes a scale member having flexibility and being fixed to a circumferential portion of the annular member, and a detector facing the scale member and configured to detect relative rotation between the scale member and the detector. The circumferential portion of the annular member includes multiple convex portions and multiple concave portions along a circumferential direction of the annular member. The scale member is in contact with the multiple convex portions. Both ends, in the circumferential direction, of the scale member are fixed to the circumferential portion.

The present invention provides as further another aspect thereof a rotation detection apparatus including an annular member, a scale member having flexibility and being fixed to a circumferential portion of the annular member, and a detector facing the scale member and configured to detect relative rotation between the scale member and the detector. The circumferential portion of the annular member includes multiple convex portions in contact with the scale member and a circumferential surface arranged at a position different from those of the multiple convex portions in a direction of an axis of the annular member. A length of a circle in contact with the multiple convex portions is shorter than a longitudinal length of the scale member. A length of the circumferential surface along a circumferential direction of the annular member is not shorter than the longitudinal length of the scale member. The multiple convex portions and the circumferential surface are smoothly connected to each other in the direction of the axis.

The present invention provides as yet another aspect thereof a lens apparatus and an image pickup apparatus including the above-described rotation detection apparatus.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 1:
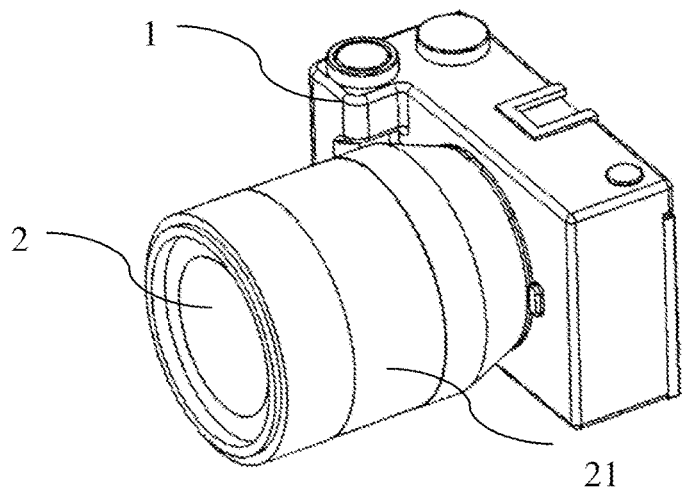
FIG. 1 is an external view of an interchangeable lens that is Embodiment 1 of the present invention and a camera body.

FIG. 1 illustrates an interchangeable lens 2 as an optical apparatus or a lens apparatus that is a first embodiment (Embodiment 1) of the present invention, and a camera body 1 as an image pickup apparatus to which the interchangeable lens 2 is detachably attached. On an outer circumference of the interchangeable lens 2, an operation ring 21 as an endless rotatable operation member is provided.

Figure 2:
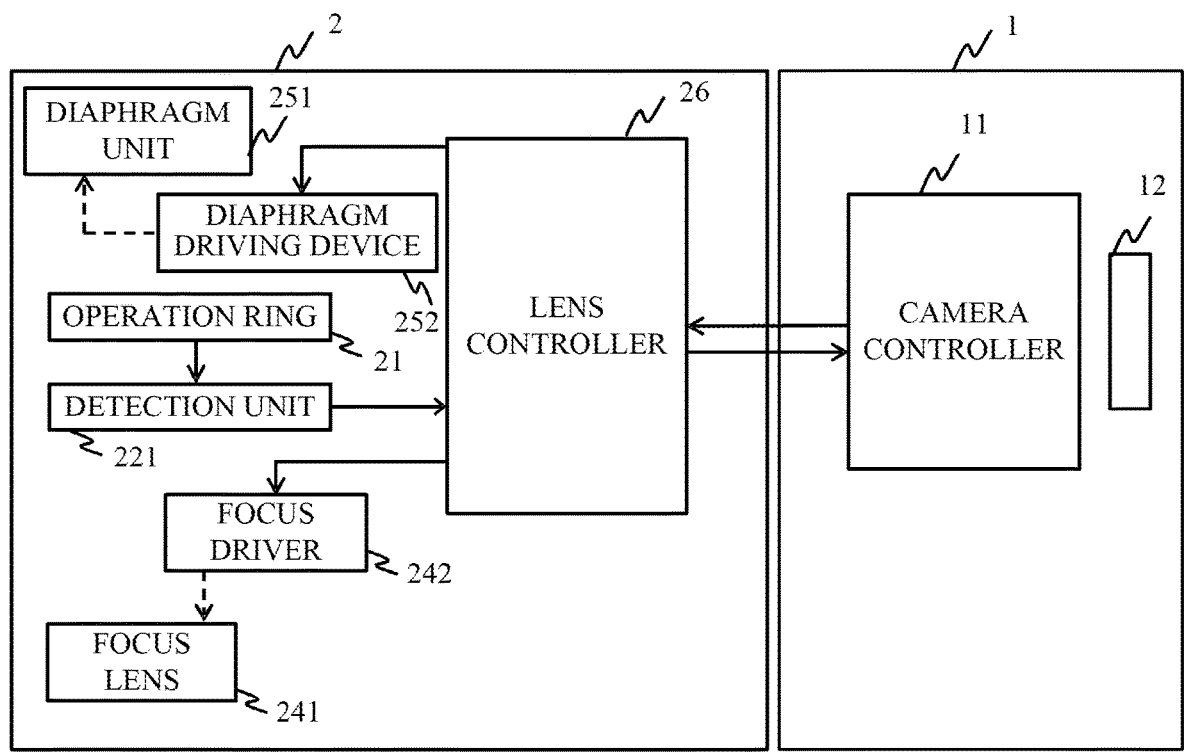
FIG. 2 is a block diagram illustrating a configuration of the interchangeable lens of Embodiment 1.

FIG. 2 illustrates a configuration of the interchangeable lens 2. The interchangeable lens 2 includes the operation ring 21, a detector 221, a focus lens 241, a focus driver 242, a diaphragm (aperture stop) unit 251, a diaphragm driving device 252, and a lens controller 26. The detector 221 includes a photo reflector that receives a reflected light from a reflective scale described later, and outputs a detection signal in response to rotation of the operation ring 21. The lens controller 26 can detect, using the detection signal from the detector 221, a rotation direction, a rotation amount and a rotation speed of the operation ring 21.

The focus lens 241 is provided in an image pickup optical system (not illustrated) that is housed in the interchangeable lens 2 for adjusting a focal position of the image pickup optical system. The focus driver 242 is an actuator that moves the focus lens 241 in an optical axis direction of the image pickup optical system (in which an optical axis thereof extends). The camera body 1 includes an image sensor 12 configured to photoelectrically convert an optical image (object image) formed by the image pickup optical system.

The diaphragm unit 251 includes multiple diaphragm blades that form a stop aperture, and changes the size of the stop aperture to adjust the amount of light passing through the stop aperture. The diaphragm driving device 252 is an actuator that drives the diaphragm blades of the diaphragm unit 251. The lens controller 26 is a microcomputer that acquires operation signals from the detector 221, communicates with a camera controller 11 provided in the camera body 1, and controls the focus driver 242 and the diaphragm driving device 252. A function is assigned to the operation ring 21 through a user's setting in the camera body 1; the function is one of a function of driving the focus lens 241 to adjust the focal position in response to user's operation of the operation ring 21 or a function of driving the diaphragm unit 251 to adjust the light amount in response thereto. The lens controller 26 as an operating unit detects the rotation direction, the rotation amount and the like of the operation ring 21 from the detection signal from the detector 221, and uses the detection result to control the focus driver 242 or the diaphragm driving device 252 according to the function assigned to the operation ring 21. The lens controller 26 also receives a focus drive command for AF and a diaphragm drive command for AE from the camera body 1 (camera controller 11), and controls the focus driver 242 and the diaphragm driving device 252.

Figure 3:
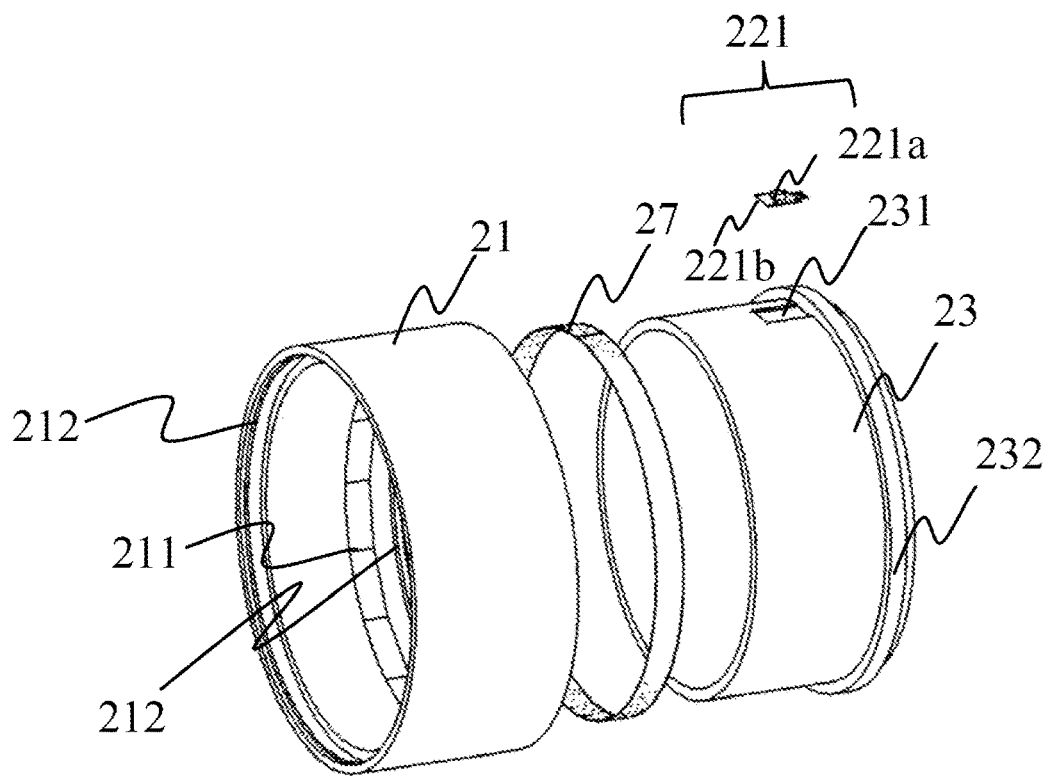
FIG. 3 is an exploded perspective view illustrating a configuration of a rotation detection device in Embodiment 1.

Next, with reference to FIG. 3, description will be made of a configuration of the rotation detection device including the detector 221 that detects the rotation of the operation ring 21. In the following description, an object side in the optical axis direction is referred to as "a front side", and an image side is referred to as "a rear side". Further, a direction around the optical axis is referred to as "a circumferential direction", and a direction orthogonal to the optical axis is referred to as "a radial direction".

The rotation detection device includes a fixed barrel 23, the operation ring 21, a reflective scale 27 as a scale member, and the detector 221. The fixed barrel 23 is a base member of the interchangeable lens 2, and is provided with a rotation receiving portion 232 for guiding the rotation of the operation ring 21 and a sensor fixing portion 231 for fixing the detector 221.

The operation ring 21 is the operation member as described above, and is an annular member to which the reflective scale 27 is fixed at an inner circumferential portion thereof. In the present embodiment, the operation ring 21 is the operation member and the annular member, but the operation member and the annular member may be separate members.

The detector 221 includes a sensor (photo reflector) 221a, and a sensor FPC 221b on which the sensor 221a is mounted. The detector 221 is fixed to the sensor fixing portion 231 of the fixed barrel 23.

Figure 4:
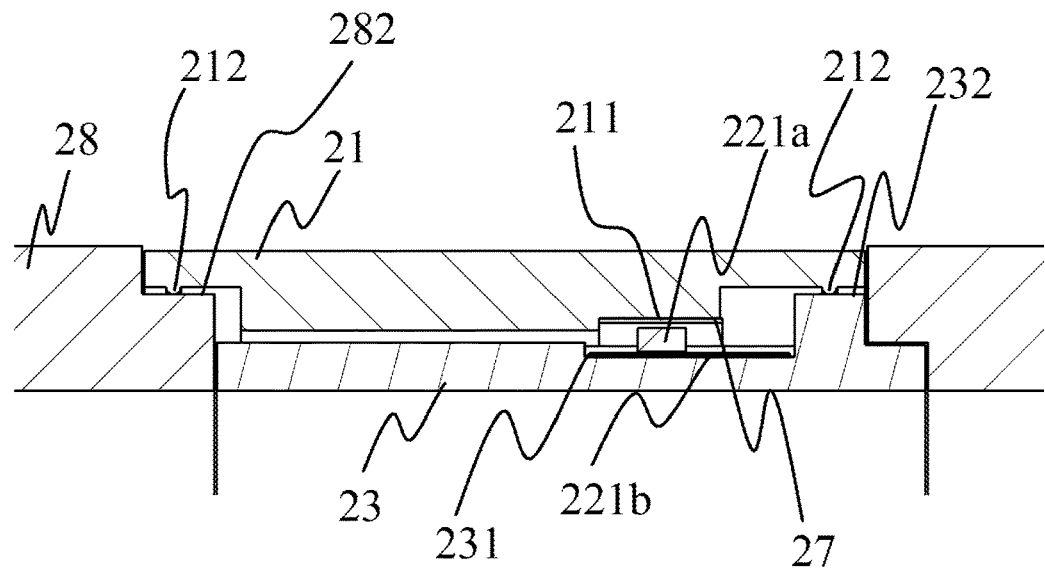
FIG. 4 is a sectional view illustrating the configuration of the rotation detection device.

On the inner circumferential portion of the operation ring 21A, a scale receiving portion 211 and two rotational sliding portions 212 provided at the front and back of the scale receiving portion 211. The reflective scale 27 is fixed to the scale receiving portion 211 as described later. As illustrated in FIG. 4, the rear rotational sliding portion 212 rotatably engages with the rotation receiving portion 232 of the fixed barrel 23. The front rotational sliding portion 212 rotatably engages with a rotation receiving portion 282 of a front barrel 28 coupled to the fixed barrel 23. This configuration sets a rotation center axis of the operation ring 21 with respect to the fixed barrel 23 and the front barrel 28.

Figure 5:
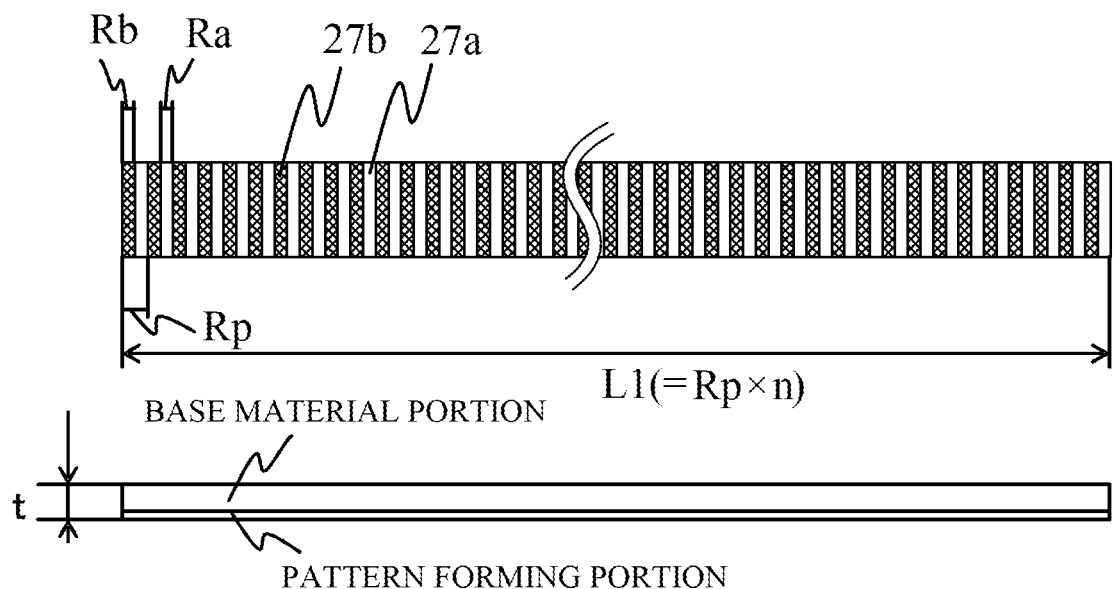
FIG. 5 illustrates a reflective scale in Embodiment 1.

FIG. 5 is a developed view of a pattern surface and a side surface of the reflective scale 27. The reflective scale 27 is a flexible sheet member in which, on its pattern surface, multiple reflective portions 27a and multiple non-reflective portions 27b are alternately disposed. As illustrated in FIG.

3, the reflective scale 27 is bent in a ring shape and fixed to the scale receiving portion 211 of the operation ring 2. The reflective portion 27a and the non-reflective portion 27b have mutually different reflectances (the reflectance of the reflective portion 27a is higher than that of the non-reflective portion 27b). That is, on the pattern surface, a pattern whose reflectance is periodically changed is formed.

In FIG. 5, Ra represents a width of the reflective portion 27a in a longitudinal direction (circumferential direction) of the reflective scale 27, and Rb represents a width of the non-reflective portion 27b in the same direction. Further, Rp represents a length from one reflective portion 27a to the next reflective portion 27a. The length is a predetermined pitch, and is hereinafter referred to as "a pattern pitch". In the present embodiment, a length L1 of the reflective scale 27 in the longitudinal direction is set to an integral multiple (×n) of the pattern pitch Rp. One of both ends of the reflective scale 27 in the longitudinal direction is provided with a reflective portion 27a as a part of the pattern, and the other thereof is provided with a non-reflective portion 27b as another part of the pattern.

Further, t represents a thickness of the reflective scale 27 when viewed from its side. The thickness t includes a thicknesses of a base material portion and a pattern forming portion. The base material portion is made of a flexible plate material that is a metal material such as SUS or a resin material such as PET. In the pattern forming portion, the above-described pattern is formed by printing non-reflecting surfaces on a reflective material. The surface (lower surface in FIG. 5) of the pattern forming portion is the above-described pattern surface.

Figure 6:
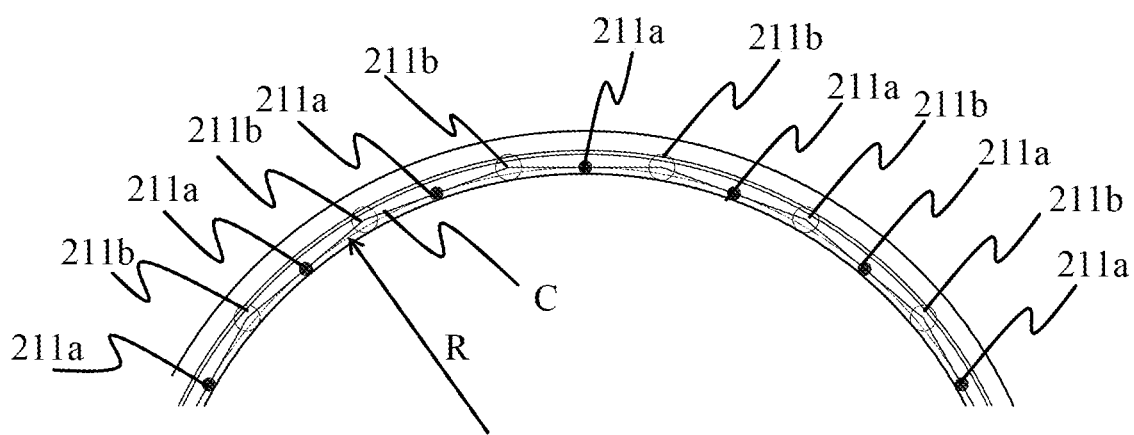
FIG. 6 illustrates a shape of a scale receiving portion of an operation ring in Embodiment 1.
Figure 7:
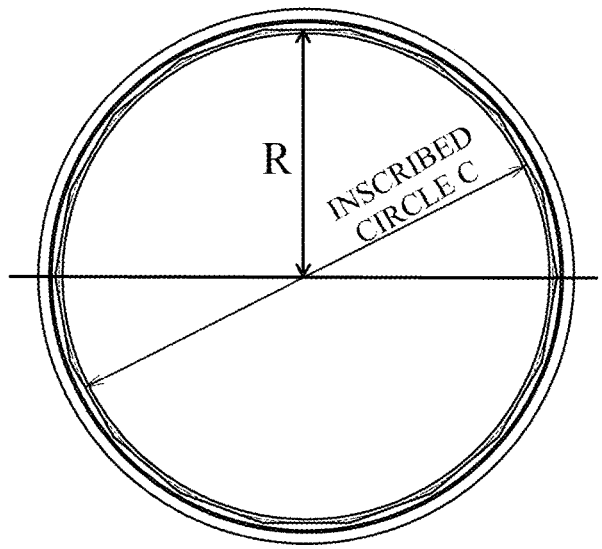
FIG. 7 illustrates an inscribed circle of convex portions of the scale receiving portion.

Next, with reference to FIG. 6, description will be made of the scale receiving portion 211 of the operation ring 21. The scale receiving portion 211 is configured by alternately disposing multiple convex portions (contacting portions) 211a and multiple concave portions (non-contacting portions) 211b in the circumferential direction. As illustrated in FIG. 7, a circle inscribed in the multiple convex portions 211a is defined as an inscribed circle C. The concave portion 211b is a portion that is concave radially outward from the inscribed circle C. R represents a shortest distance from the center of the inscribed circle C to the convex portion 211a, and L2 represents a circumferential length of the inscribed circle C.

Figure 8:
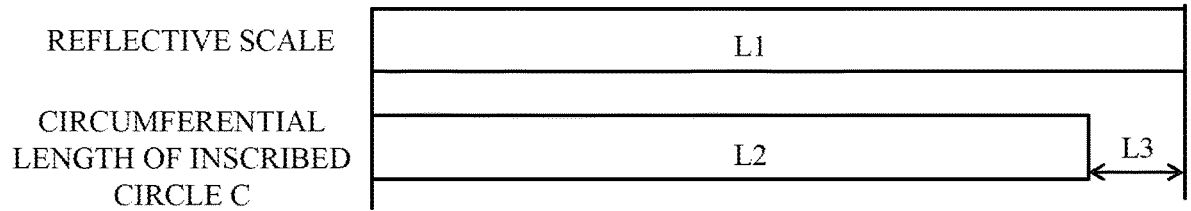
FIG. 8 is a developed view illustrating a relation between a reflective scale length and a circumferential length of the inscribed circle.

FIG. 8 is a developed view illustrating the reflective scale 27 and the inscribed circle C. The length L1 of the reflective scale 27 is set longer than the circumferential length L2 of the inscribed circle C by a predetermined value (length) L3. Conversely, the circumferential length L2 of the inscribed circle C is set shorter than the length L1 of the reflective scale 27 by the predetermined length L3. In the present embodiment, the reflective scale 27 in which its both ends (both end surfaces) are in contact with each other is fixed to the scale receiving portion 211.

Figure 9A:
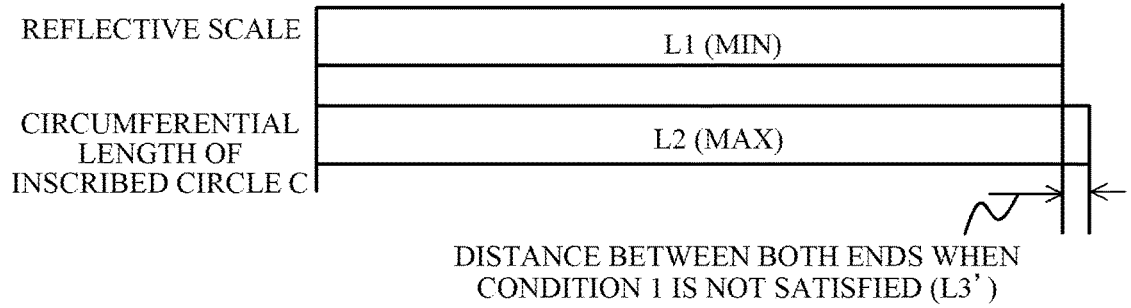
FIGS. 9A and 9B are developed views for explaining a condition that the reflective scale length and the circumferential length of the inscribed circle satisfy.
Figure 9B:
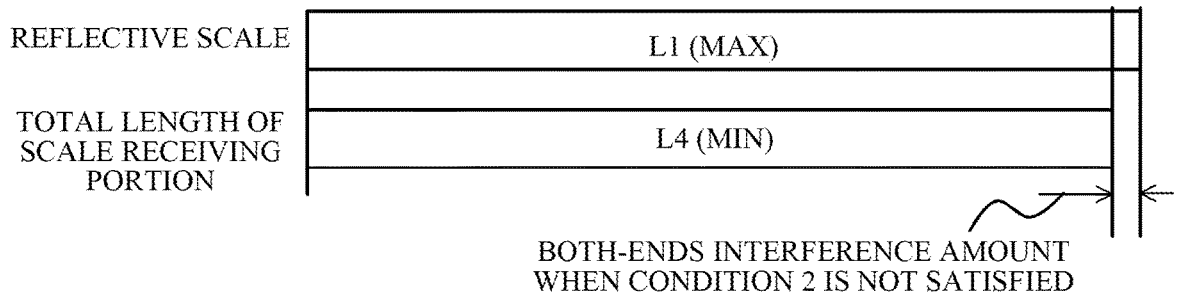

Further, the shortest distance R setting radial positions of the convex portions 211a in the scale receiving portion 211 is set by the length L1 of the reflective scale 27 and the predetermined length L3. The predetermined length L3 is set so as to satisfy the following two conditions even if the reflective scale 27 and the operation ring 21 have dimensional variations within their component tolerance and have a difference in expansion amount due to a difference between their linear expansion coefficients. FIGS. 9A and 9B show examples where these conditions are not satisfied. In other words, the case shown by FIGS. 9A and 9B do not satisfy the following conditions 1 and 2.

Condition 1: The circumferential length L2 of the inscribed circle C is shorter than the length L1 of the reflective scale 27.

Condition 2: A total length L4 of lengths along two surfaces (slope surfaces) connecting all the convex portions 211a on the scale receiving portion 211 and the two concave portions 211b on both sides of each convex portion 211a is longer than the length L1 of the reflective scale 27.

Figure 10:
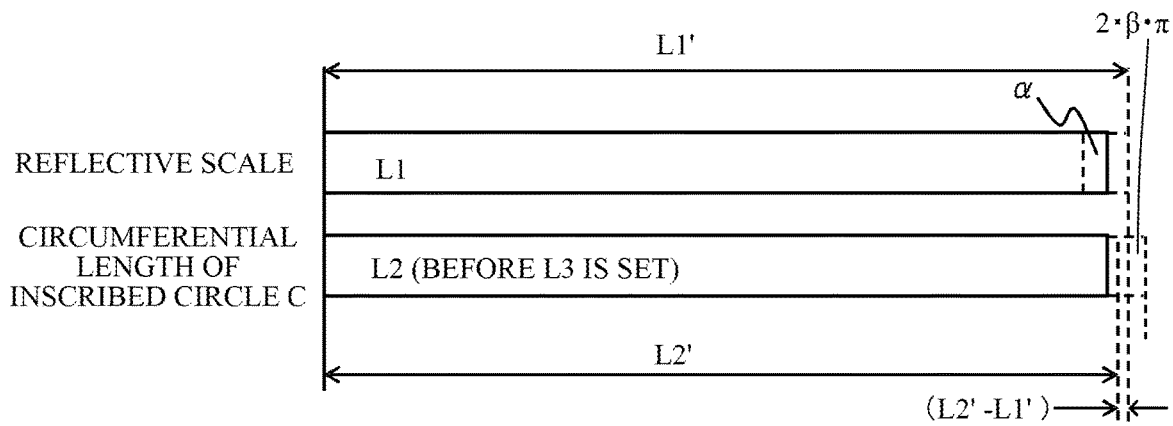
FIG. 10 is a developed view illustrating a relation between the reflective scale and the inscribed circle under a temperature environment.

Description will be made of a maximum value L3' of a distance between the both ends of the reflective scale 27 for satisfying Condition 1 when the reflective scale 27 is bent in the ring shape with reference to FIG. 10. First, description will be made of a case where the linear expansion coefficient of the material (resin) of the operation ring 21 is greater than that of the material of the base material portion of the reflective scale 27. The length L1 of the reflective scale 27 has a tolerance of $\pm\alpha$. When the tolerance of the shortest distance R from the center of the inscribed circle C to the convex portion 211a is $\pm\beta$, an increment of the circumferential length of the inscribed circle C from its design value when the circumferential length of the inscribed circle C becomes maximum is expressed by following expression (1):

$$2 \cdot \beta \cdot \pi. \tag{1}$$

In following expression (2), L1' and L2' respectively represent a length of the reflective scale 27 and a circumferential length of the inscribed circle C in consideration of their variation amounts due to linear expansion coefficients at a maximum temperature in an operation temperature range of the interchangeable lens 2. By summing up these values in a direction in which the distance between the both ends of the reflective scale 27 increases, the maximum value L3'(A) is expressed by following expression (2):

$$L3'(A) = \alpha + 2 \cdot \beta \cdot \pi \circ (L2' - L1'). \tag{2}$$

When the linear expansion coefficient of the material of the operation ring 21 is smaller than that of the material of the base material portion of the reflective scale 27, the distance between the both ends of the reflective scale 27 becomes largest at low temperature. Therefore, when a length of the reflective scale 27 and a circumferential length of the inscribed circle C at a lowest temperature in the operation temperature range is respectively L1" and L2", the maximum value L3'(B) is expressed by following expression (3):

$$L3'(B) = \alpha + 2 \cdot \beta \cdot \pi + (L1'' - L2''). \tag{3}$$

Description will be made of Condition 2 by using an amount of interference between the both ends of the reflective scale 27 (hereinafter referred to as "a both-ends interference amount). When the linear expansion coefficient of the material of the operation ring 21 is greater than that of the material of the base material portion of the reflective scale 27, the maximum value of the both-ends interference amount of the reflective scale 27 is L3'(B). When the linear expansion coefficient of the material of the operation ring 21 is smaller than that of the material of the base material portion of the reflective scale 27, the maximum value of the both-ends interference amount of the reflective scale 27 is L3'(A).

Figure 11:
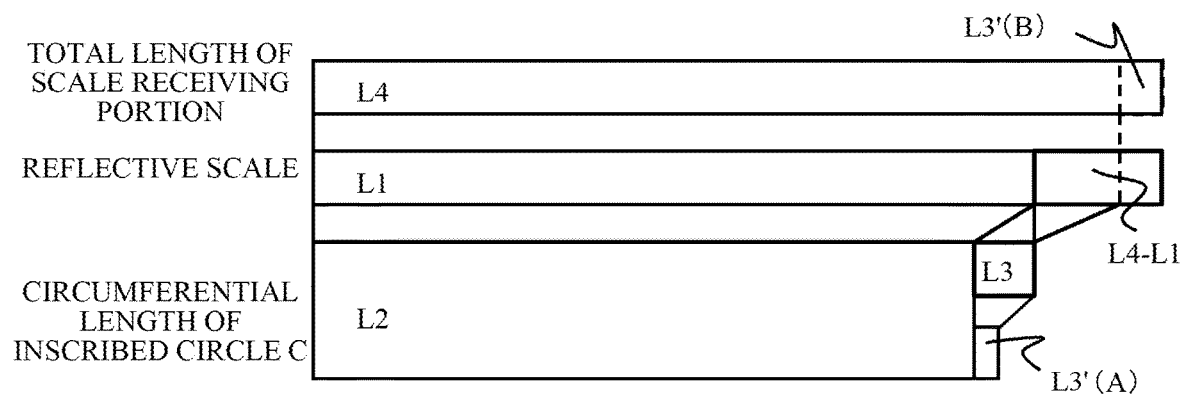
FIG. 11 is a developed view illustrating a relation between the reflective scale length, the circumferential length of the inscribed circle and a total length of the scale receiving portion.

From the above, the predetermined length L3 is set in a range shown in following expression (4) or (5). When the linear expansion coefficient of the material of the operation ring 21 is greater than that of the material of the base material portion of the reflective scale 27, the predetermined length L3 is expressed by following expression (4) as illustrated in FIG. 11:

$$L3'(A) < L3 < L4 - L1 - L3'(B). \tag{4}$$

On the other hand, when the linear expansion coefficient of the material of the operation ring 21 is smaller than that of the material of the base material portion of the reflective scale 27, the predetermined length L3 is expressed by following expression (5):

$$L3'(B) < L3 < L4 - L1 - L3'(A). \tag{5}$$

The above result makes it possible to derive the predetermined length L3 that satisfies Conditions 1 and 2. The shortest distance R is set such that the circumferential length of the inscribed circle C becomes L2 obtained by subtracting the predetermined length L3 from the length L1 of the reflective scale 27.

The scale receiving portion 211 formed as described above holds the reflective scale 27 by pressing the reflective scale 27 to the convex portions 211a and causes the both ends of the reflective scale 27 to contact each other, regardless of variation in component accuracy or temperature change. The pressing force to the convex portions 211a is given by a biasing force (elastic force) generated in the ring-shaped bent reflective scale 27 having elasticity. Further, a contact force between the both ends of the reflective scale 27 is given by a biasing force generated by inward deformation of the reflective scale 27 into the multiple concave portions 211b.

Figure 12:
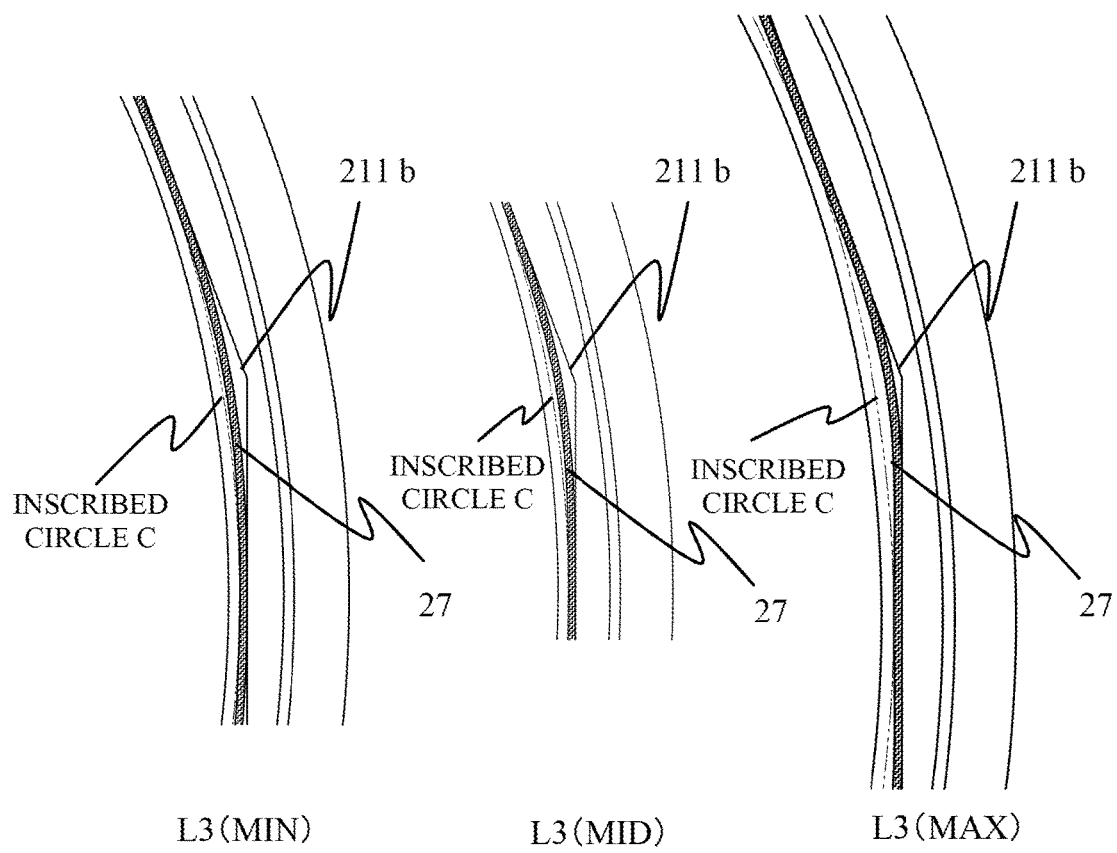
FIG. 12 illustrates deformations of the reflective scale respective for different predetermined values L3.

An actual difference between the length L1 of the reflective scale 27 and the circumferential length L2 of the inscribed circle C is absorbed, as illustrated in FIG. 12, by changing an amount of the deformation of the reflective scale 27 into the concave portion 211b, and thereby a deformation direction of the reflective scale 27 can be controlled so as not to be radially inward.

The predetermined length L3 set to a large value within the above conditions increases the deformation amount of the reflective scale 27 into the concave portion 211b, and increases a contact force between the above-described both ends and the biasing force to the convex portions 211a. On the other hand, the predetermined length L3 set to a small value within the above conditions decreases the deformation amount of the reflective scale 27 into the concave portion 211b, and decreases the contact force between the both ends and the biasing force to the convex portions 211a. Decreasing the contact force between the both ends can reduce plastic deformation of the reflective scale 27.

The both ends of the reflective scale 27 in contact with each other as in the present embodiment prevents reflection at the joint between the both ends and a pitch variation of the non-reflecting portions 27b from being affected by assembly error of the rotation detection device; the pitch variation is within the component tolerance of the reflective scale 27. Since the non-reflecting portion 27b is provided at one end of the reflective scale 27, a minute non-reflective region generated at the joint is also detected as a part of the non-reflective portion 27b adjacent thereto.

Adopting the configuration in which the both ends of the reflective scale 27 are in contact with each other as in the present embodiment makes it possible to reduce the scale pitch Rp. Thus, the rotation detection device of the present embodiment can detect the rotation of the operation ring 21 with high resolution, and can be used for performing high-definition position control of the focus lens 241.

Next, with reference to FIGS. 4 and 13, description will be made of a rotation detection method performed by the rotation detection device. The sensor 221a is fixed to the sensor fixing portion 231 of the fixed barrel 23 so as to face the pattern surface of the reflective scale 27 fixed to the scale receiving portion 211 of the operation ring 21. The sensor 221a has a light emitter that emits light toward the pattern of the reflective scale 27, and two light receivers A and B each of which receives the light reflected by the reflective portion 27a of the pattern. The light receivers A and B are disposed such that a center distance therebetween is equal to a center distance in the circumferential direction between mutually adjacent reflective and non-reflective portions 27a and 27b in the reflective scale 27.

When the operation ring 21 rotates relative to the fixed barrel 23, the reflective scale 27 moves (rotates) relative to the sensor 221a, and the light from the light emitter of the sensor 221a is projected alternately onto the reflective portion 27a and the non-reflective portion 27b of the reflective scale 27. While the operation ring 21 rotates in one direction, the light projected onto a certain reflective portion 27a is reflected by that reflective portion 27a, and the reflected light is received by one of the light receivers A and B. Then, the light projected onto the next reflective portion 27a is reflected by that reflective portion 27a, and the reflected light is received by the other of the light receivers A and B.

Figure 13:
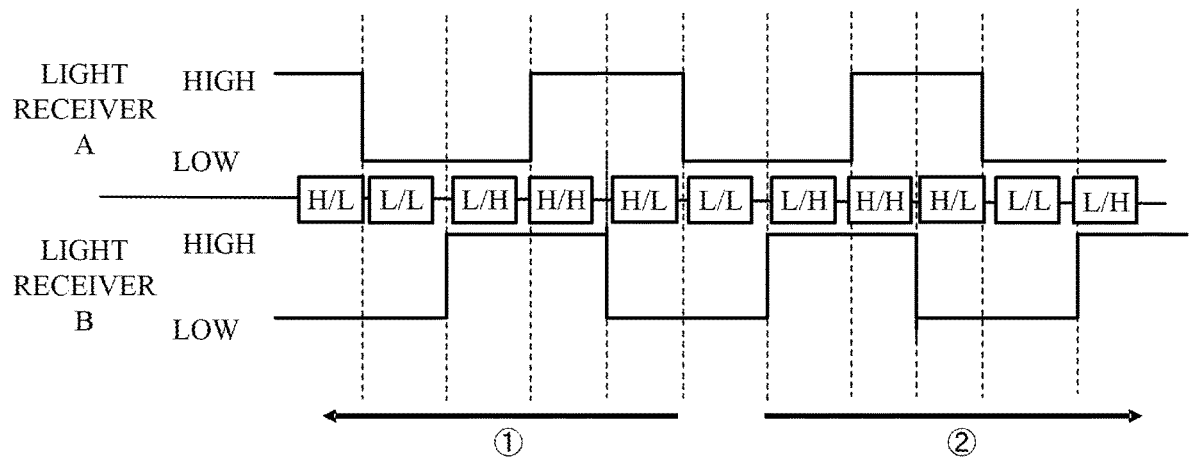
FIG. 13 illustrates a rotation detection method using a sensor in Embodiment 1.

As illustrated in FIG. 13, when an amount of the received reflected light is higher than a certain threshold, outputs from the light receivers A and B are High, and when the amount of the received reflected light is lower than the threshold, the outputs are Low. Therefore, when the operation ring 21 rotates in one direction, the light receivers A and B output alternately High and Low with a phase difference of 90°. In FIG. 13, for example, a case where the output from the light receiver A is High and the output from the light receiver B is Low is indicated as "H/L".

The lens controller 26 detects the rotation direction, the rotation amount and the rotation speed of the operation ring 21 from the combination of the outputs from the light receivers A and B. Specifically, for example, the lens controller 26 detects, when the outputs from the light receivers A and B change from "H/L" to "L/L", a rotation amount corresponding to one pulse. Further, the lens controller 26 detects the rotational speed from the number of pulses detected within a predetermined time. Furthermore, the lens controller 26 detects, when the outputs from the light receivers A and B change from "H/L"→"H/H"→"L/H"→"L/L"→"H/L", that the rotation direction of the operation ring 21 is the direction illustrated by the circled 1 in FIG. 13. Moreover, the lens controller 26 detects, when the outputs from the light receivers A and B change from "H/L"→"L/L"→"L/H"→"H/H"→"H/L", that the rotation direction of the operation ring 21 is the direction illustrated by the circled 2.

Embodiment 2

Figure 14:
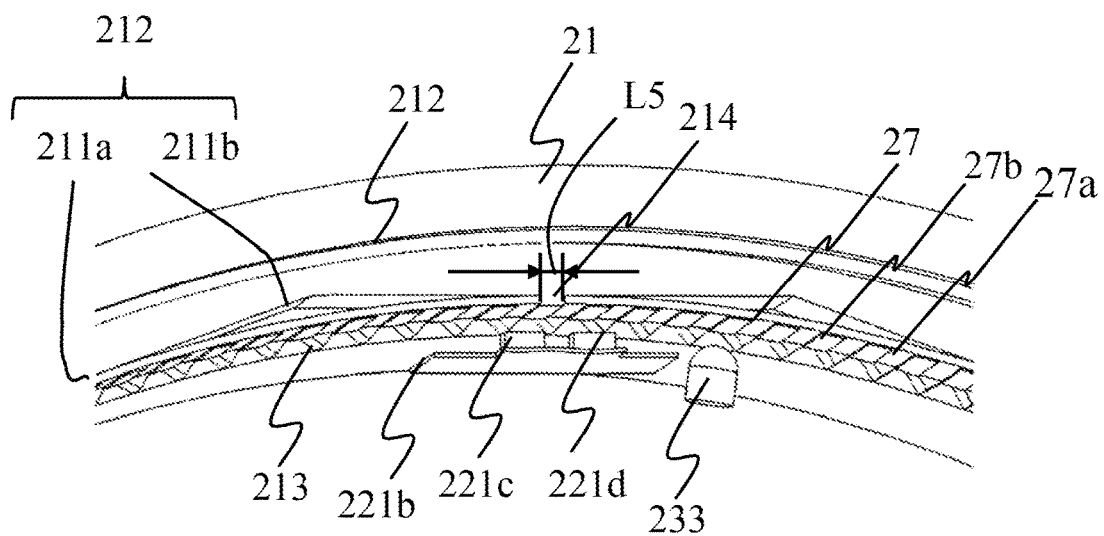
FIG. 14 illustrates a configuration of a rotation detection device that is Embodiment 2 of the present invention.

Next, with reference to FIG. 14, description will be made of a configuration of a rotation detection device that is a second embodiment (Embodiment 2) of the present invention. The description will be mainly made of differences from Embodiment 1.

The fixed barrel 23 is provided with a click pin 233 biased by a spring (not illustrated) toward the operation ring 21. The detector 221 includes two sensors 221c and 221d, and a sensor FPC 221b on which the sensors 221c and 221d are mounted. The detector 221 is fixed to the sensor fixing portion 231 provided on the fixed barrel 23.

On the inner circumferential portion of the operation ring 21, as in Embodiment 1, the scale receiving portion 211 is provided in which multiple convex portions 211a and multiple concave portions 211b are alternately disposed in the circumferential direction. However, in Embodiment 2 a scale end contacting portion 214 is provided in a part of the scale receiving portion 211 in the circumferential direction (at a position of one convex portion 211a). The scale end contacting portion 214 is a protruding portion that protrudes (is convex) radially inward from the inscribed circle C.

Further, a click groove portion 213 is formed over the entire scale receiving portion 211 in the circumferential direction.

The tip of the click pin 233 biased as described above makes contact onto the click groove portion 213. When the operation ring 21 is rotated by a user, the click pin 233 moves forward and backward by concave and convex portions provided in the circumferential direction in the click groove portion 213, and thus a click feeling is given to the user.

The both ends of the reflective scale 27 make contact onto circumferential end surfaces of the scale end contacting portion 214 by an elastic force of the reflective scale 27. In the present embodiment, the length L1 of the reflective scale 27 is set longer than the length obtained by subtracting a circumferential width of the scale end contacting portion 214 from the circumferential length of the inscribed circle C. Further, the length L1 of the reflective scale 27 is set to a length obtained by subtracting the circumferential width Rb of the scale end contacting portion 214, which is equal to the circumferential width of one non-reflecting portion 27b from the integral multiple of the pattern pitch Rp.

At the both ends of the reflective scale 27, the reflective portions 27a are provided. In addition, between the reflective portions 27a provided at the both ends of the reflective scale 27, the scale end contacting portion 214 is provided which has the same circumferential width L5 as that of the non-reflective portion 27b.

The predetermined length L3 is set so as to satisfy the conditions described in Embodiment 1 even if the reflective scale 27 and the operation ring 21 have dimensional variations within their component tolerance and have a difference in expansion amount due to a difference between their linear expansion coefficients. In the present embodiment, in consideration of the width L5 of the scale end contacting portion 214, the circumferential length L2 of the inscribed circle C described in Embodiment 1 is set to "L2–L5". As a result, expression (2) described in Embodiment 1 becomes as follows:

$$L3'(A)=\alpha+2\cdot\beta\cdot\pi+((L2'-L5)-L1'). \quad (6)$$

When the linear expansion coefficient of the material of the operation ring 21 is smaller than that of the material of the base material portion of the reflective scale 27, expression (3) described in Embodiment 1 becomes as follows:

$$L3'(B)=\alpha+2\cdot\beta\cdot\pi+(L1''-(L2''-L5)). \quad (7)$$

When the linear expansion coefficient of the material of the operation ring 21 is greater than that of the material of the base material portion of the reflective scale 27, condition (4) in Embodiment 1 becomes as follows:

$$L3'(A)<L3<L4-L1-L3'(B). \quad (8)$$

On the other hand, when the linear expansion coefficient of the material of the operation ring 21 is smaller than that of the material of the base material portion of the reflective scale 27, condition (5) in Embodiment 1 becomes as follows:

$$L3'(B)<L3<L4-L1-L3'(A). \quad (9)$$

In the present embodiment, the center of the circumferential width of the scale end contacting portion 214 is set so as to coincide with the circumferential center of the concave portion of the click groove portion 213. Then, matte processing or the like is performed on the surface of the scale end contacting portion 214 facing the sensor 221a such that the surface becomes a non-reflective surface. Thereby, phases of the click groove portion 213 and the scale end contacting portion 214 are matched to each other, and thus, in the circumferential direction, phases of the concave and convex portions of the click groove portion 213 and the reflective and non-reflective portions 27a and 27b of the reflective scale 27 are respectively matched to each other.

Next, description will be made of a rotation detection method using the rotation detection device in the present embodiment. The sensors 221c and 221d are fixed to the sensor fixing portion 231 of the fixed barrel 23 so as to face the pattern surface of the reflective scale 27 fixed to the scale receiving portion 211 of the operation ring 21. Each of the sensors 221c and 221d has a light emitter that emits light toward the reflective scale 27 and a light receiver that receives the reflected light from the reflective scale 27. A center distance between the light receiving portions of the sensors 221c and 221d in the circumferential direction matches a center distance between the mutually adjacent reflective and non-reflective portions 27a and 27b in the reflective scale 27.

When the operation ring 21 rotates relative to the fixed barrel 23, the reflective scale 27 moves (rotates) relative to the sensors 221c and 221d, and the lights from the light emitters of the sensors 221c and 221d are each projected alternately onto the reflective portion 27a and the non-reflective portion 27b of the reflective scale 27. While the operation ring 21 rotates in one direction, the light from the light emitter of the sensor 221c projected onto a certain reflective portion 27a is reflected by that reflective portion 27a, and the reflected light is received by the light receiver of the sensor 221c. Then, the light from the light emitter of the sensor 221d projected onto the next reflective portion 27a is reflected by that reflective portion 27a, and the reflected light is received by the light receiver of the sensor 221d. The method of detecting the rotation amount and the rotation speed of the operation ring 21 is the same as that described in Embodiment 1.

Figure 15:
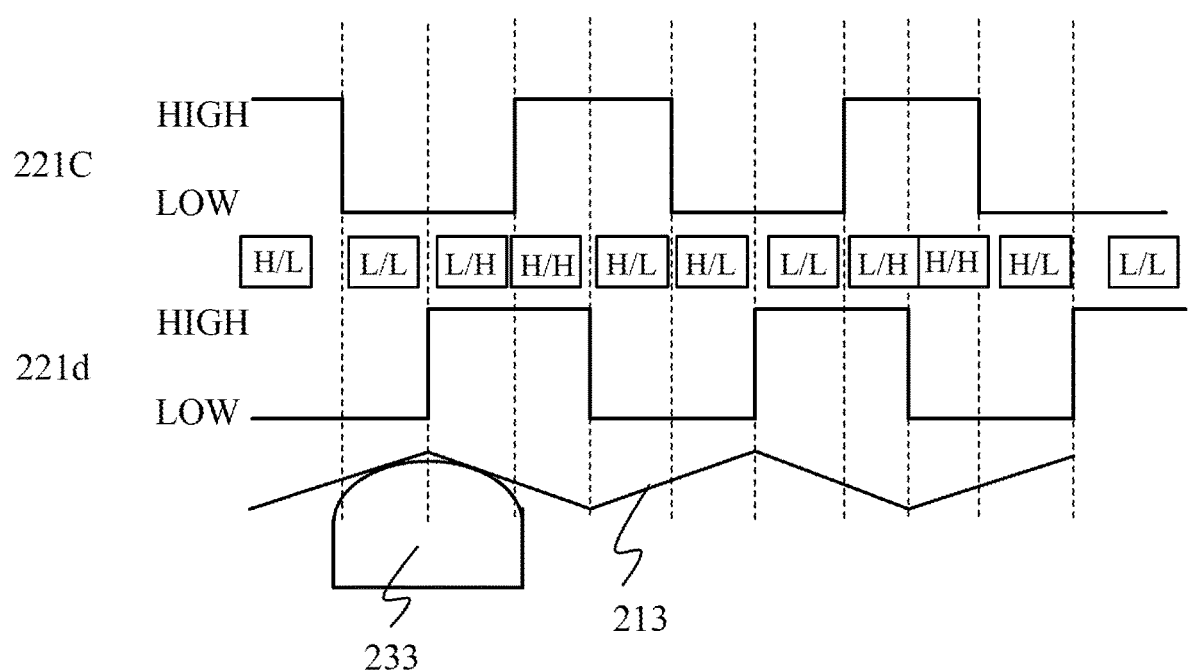
FIG. 15 illustrates a rotation detection method in Embodiment 2.

In this embodiment, the contact of the both ends of the reflective scale 27 to the scale end contacting portion 214 causes the phases of the concave and convex portions of the click groove portion 213 to match the phases of the reflective and non-reflective portions 27a and 27b of the reflective scale 27. Therefore, as illustrated in FIG. 15, when the output from the sensor 221c is Low, it can be determined that the click pin 233 is in the concave portion of the click groove portion 213. Thereby, for example, when detecting the rotation operation of the operation ring 21 instructing an aperture stop value that is set discretely in light amount adjustment, a drive instruction can be given to the diaphragm unit 251 in response to the detection of Low of the output from the sensor 221c.

In the present embodiment, the contact of the both ends of the reflective scale 27 to the scale end contacting portion 214 prevents circumferential positional displacement of the reflective scale 27 with respect to the operation ring 21. However, an auxiliary member such as adhesive, double-sided tape and adhesive tape may be used to stabilize the position of the reflective scale 27 with respect to the operation ring 21.

Figure 16A:
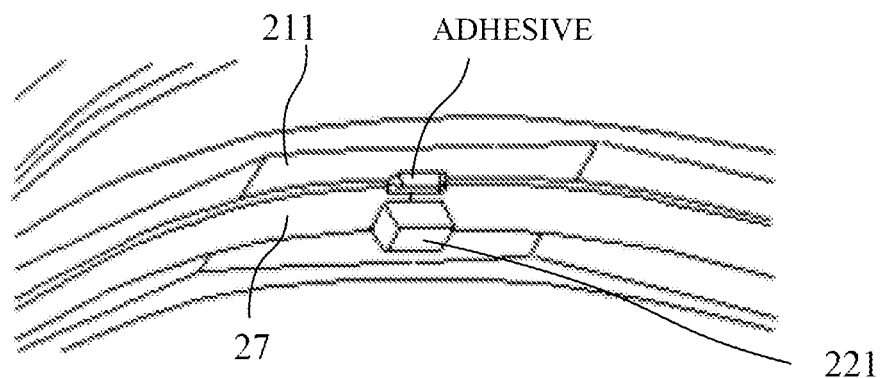
FIGS. 16A to 16C illustrates a method of fixing a reflective scale in Embodiment 2 using an auxiliary member.
Figure 16B:
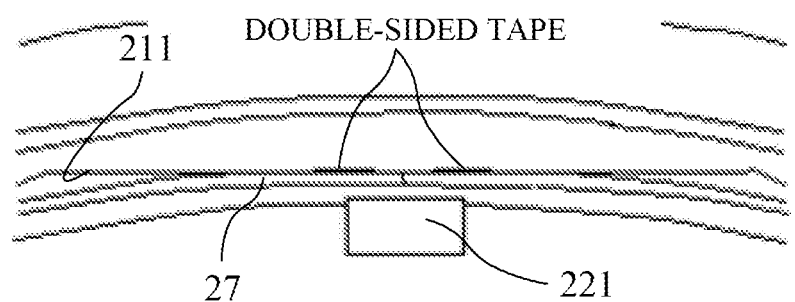
Figure 16C:
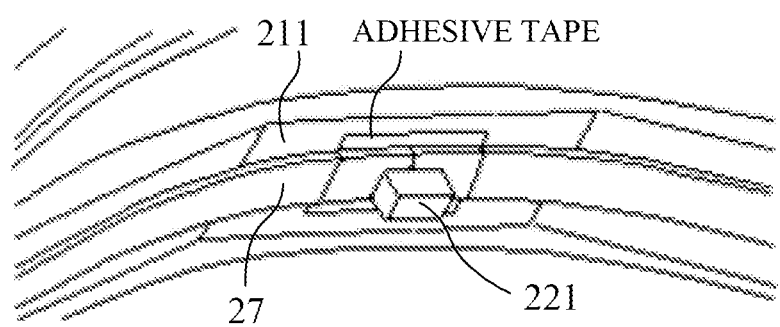

FIG. 16A illustrates an example in which the both ends of the reflective scale 27 are fixed to the scale receiving portion 211 using adhesive. Further, FIG. 16B illustrates an example in which the both ends of the reflective scale 27 are fixed to the scale receiving portion 211 using double-sided tapes. Furthermore, FIG. 16C illustrates an example in which, by attaching an adhesive tape having high light transmittance to the pattern surface at the both ends of the reflective scale 27 and the scale receiving portion 211, the both ends of the reflective scale 27 is fixed to the scale receiving portion 211. Fixing the both ends of the reflective scale 27 to the scale receiving portion 211 by adhesion or the like includes a case where the both ends of the reflective scale 27 are fixed to the scale receiving portion 211 as a result of adhesion or the like in the vicinity of the both ends (at an area between mutually adjacent concave portions in the circumferential direction).

The above-described configuration can more reliably prevent the circumferential positional displacement of the reflective scale 27 with respect to the operation ring 21. Further, fixing the reflective scale 27 to the scale receiving portion 211 with adhesive, double-sided tape or the like enables making it less susceptible to temperature change. Furthermore, when multiple fixing points by adhesion or the like are provided, influences of temperature change can be reduced by setting angles between the fixing points to the same angle, in other words, by providing the multiple fixing points at equal intervals.

Figure 17:
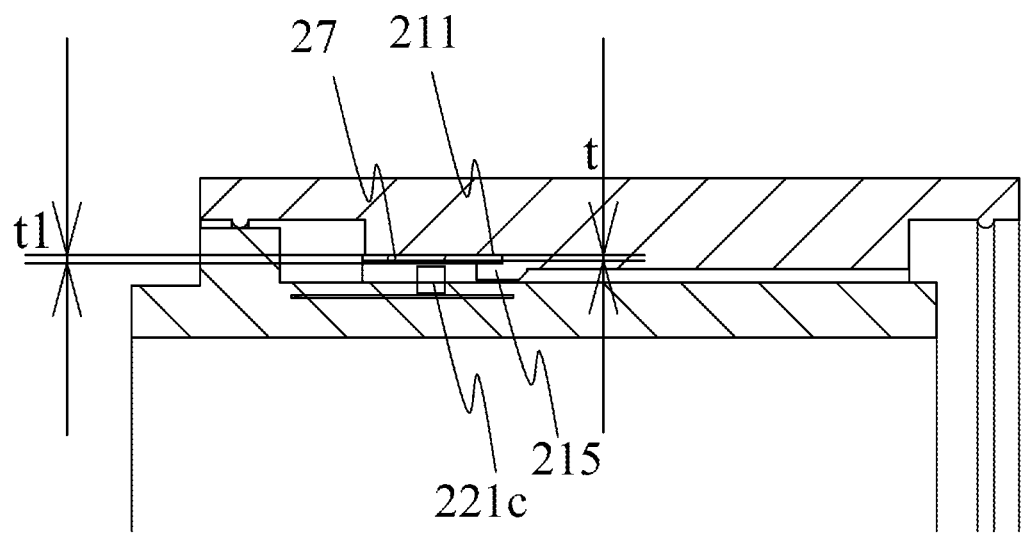
FIG. 17 illustrates a modified example for preventing displacement of the reflective scale in Embodiment 2.

Furthermore, in addition to the method using the above-described auxiliary member, as illustrated in FIG. 17, the operation ring 21 may be provided with a pressing portion 215 that sandwiches the both ends of the reflective scale 27 and presses the both ends against the scale receiving portion 211. The pressing portion 215 has a claw shape that protrudes so as to face the scale receiving portion 211. An interval t1 in the radial direction between the scale receiving portion 211 and the pressing portion 215 is set to be wider than the thickness t of the reflective scale 27 and smaller than twice of t. Although in FIG. 17 the pressing portion 215 is integrally formed in the operation ring 21, the pressing portion 215 may be manufactured as a separate component from the operation ring 21 and fixed to the operation ring 21.

Providing the pressing portion 215 more easily enables preventing the circumferential positional displacement of the reflective scale 27 with respect to the operation ring 21. Moreover, providing the pressing portion 215 also enables improving workability in fixing the reflective scale 27 to the operation ring 21 (scale receiving portion 211), that is, ease of assembly of the rotation detection apparatus.

As described above, in Embodiments 1 and 2, the inner circumferential portion of the endless rotatable operation ring 21 is provided with the scale receiving portion 211 having the convex portion 211a and the concave portion 211b, and the reflective scale 27 is fixed to the scale receiving portion 211. Further, appropriate setting of the circumferential length of the inscribed circle C of the convex portion 211a and the length of the reflective scale 27 enables fixing the reflective scale 27 to the operation ring 21 with good positional accuracy and so as to be less susceptible to temperature change.

Figure 18:
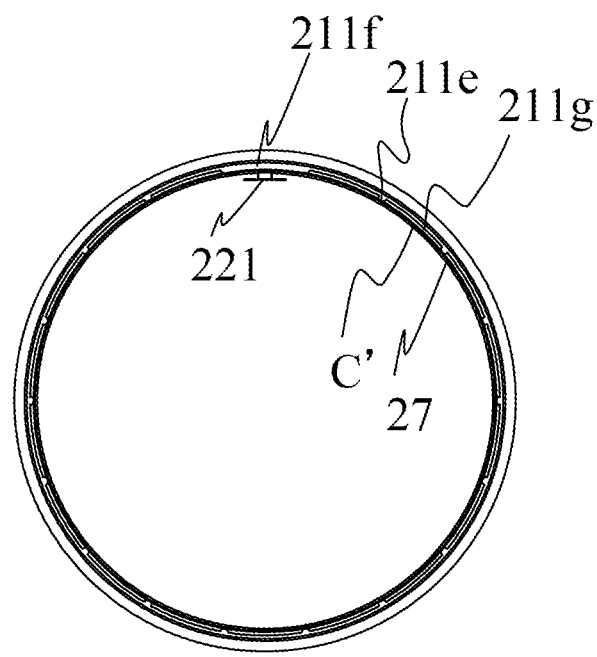
FIG. 18 illustrates convex portions and concave portions in another modified example in Embodiment 2.

In each of Embodiments 1 and 2, the scale receiving portion 211 has a regular polygonal shape in which the convex portions 211a are convex vertexes and the concave portions 211b are concave vertexes and the inscribed circle C is inscribed. However, as illustrated in FIG. 18, convex portions 211e and a circular arc convex portion 211f may be provided as convex portions, and concave portions 211g may be provided between the convex portions 211e and 211f in the circumferential direction. The concave portions 211g are concave outward in the radial direction from the inscribed circle C' of the convex portions 211e and 211f On the circular arc convex portion 211f, both ends of the reflective scale 27 contact each other, and the both ends are fixed to the circular arc convex portion 211f by adhesion or the like.

Figure 19:
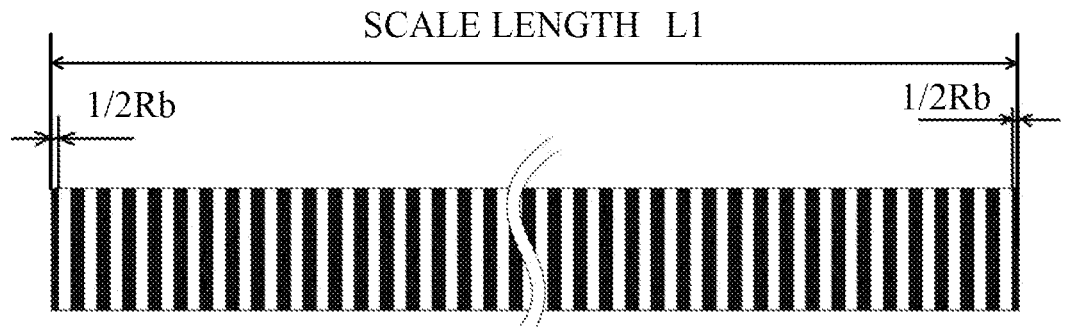
FIG. 19 illustrates a modified example of a pattern of the reflective scale in Embodiment 1.

In Embodiment 1, in the case where the both ends of the reflective scale 27 are brought into contact to each other, the reflective portion 27a is provided on one of the both ends, and the non-reflective portion 27b is provided on the other. However, as illustrated in FIG. 19, another configuration may be employed in which a reflective portion having a circumferential width ½Rb that is half the circumferential width Rb of the other reflective portions is provided at each end of the reflective scale 27, and the both ends in contact to each other forms one reflective portion having the circumferential width Rb.

Further, in Embodiments 1 and 2, the pattern formed on the reflective scale 27 is a repetitive pattern including the reflective portions 27a and the non-reflective portions 27b. However, a pattern may be used in which reflectance changes continuously from one end to the other end of the reflective scale 27 in the circumferential direction. Such a pattern makes it possible to detect an absolute rotational position in one rotation range of the operation ring 21.

Furthermore, in Embodiments 1 and 2, the description was made of the rotation detection device that detects the rotation of the operation ring 21 provided in the interchangeable lens. However, a rotation detection device having the same configuration as that of Embodiment 1 or 2 may be used to detect rotation of an operation ring provided on an outer circumference of a lens barrel of a lens-integrated camera (optical apparatus).

Moreover, in Embodiments 1 and 2, the description was made of the case where the reflective scale (scale member) 27 rotates with respect to the detector 221. However, the detector may rotate with respect to the scale member. That is, it is only necessary that the detector and the scale member rotate relative to each other.

Further, the rotation detection device in Embodiments 1 or 2 may be used not only in the optical apparatus, but also for detecting rotation of various rotatable operation members such as a volume adjusting knob of an audio apparatus and an adjusting knob of a linear motion stage apparatus. Moreover, the rotation detection device in Embodiment 1 or 2 may be used for detecting not only rotation of an operation member that is rotated by a user's rotational operation, but also rotation of a member that is rotated by a motor.

Embodiment 3

Figure 20:
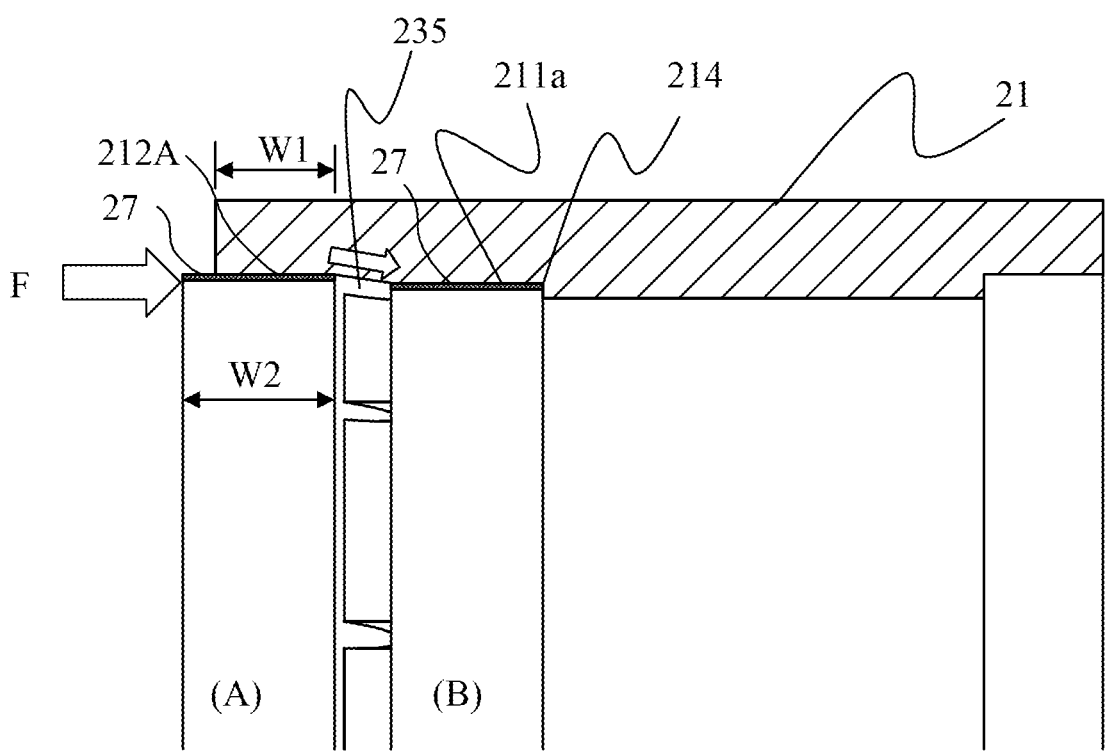
FIG. 20 is a sectional view illustrating a method of fixing a reflective scale to an operation ring in Example 3.
Figure 21:
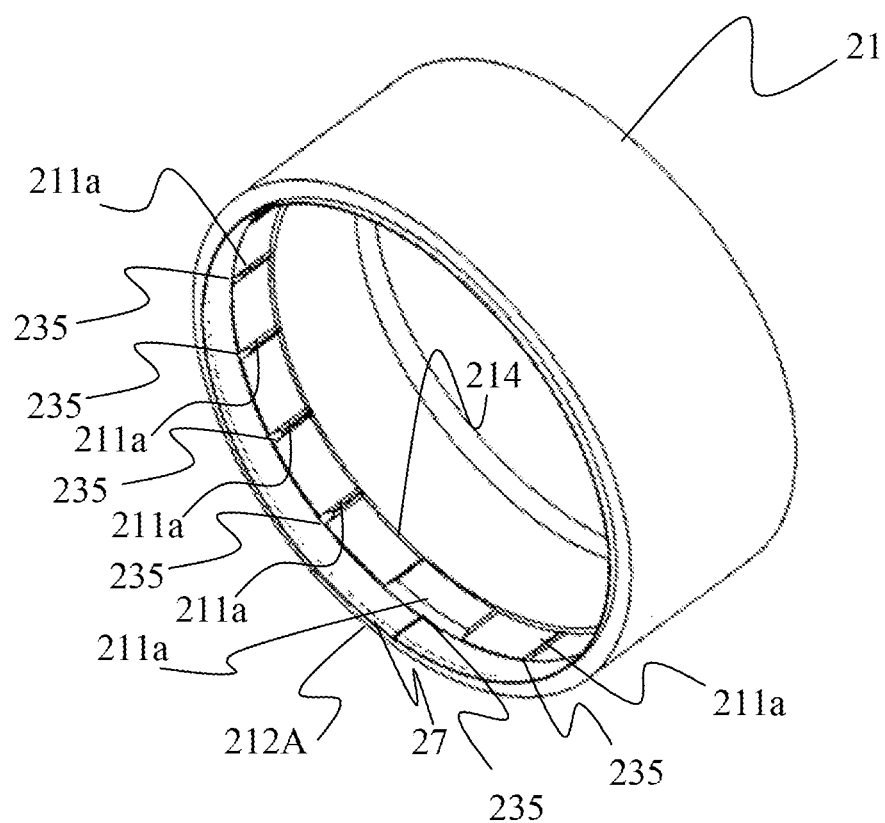
FIG. 21 is a perspective view illustrating a state in which the reflective scale is disposed on a rotational sliding portion of the operation ring in Embodiment 3.

Next, with reference to FIGS. 20 and 21, description will be made of a method of fixing the reflective scale 27 to the operation ring 21 in a third embodiment (Embodiment 3) of the present invention. FIG. 20 illustrates a section indicating the method of fixing the reflective scale 27 to the operation ring 21. FIG. 21 illustrates a state in which the reflective scale 27 is disposed at a fixing preparation diameter.

As illustrated in FIG. 20, the operation ring 21 is provided with, in addition to the convex portions (contact surfaces) 211a in which the inscribed circle C is inscribed, a rotational sliding portion (inner circumferential surface) 212A having a predetermined diameter as the fixing preparation diameter, a slope surface 235, and a scale contacting portion 214A. The rotational sliding portion 212A has a circumferential length equal to or longer than the length L1 of the reflective scale 27. That is, the fixing preparation diameter of the rotational sliding portion 212A is larger than the diameter of the inscribed circle C.

The slope surface 235 is a surface smoothly and continuously connecting the convex portions 211a and the rotational sliding portion 212A. The slope surface 235 is not limited to a flat surface as long as it is a surface smoothly and continuously connecting the convex portions 211a and the rotational sliding portion 212A, and may be a curved surface. That is, the slope surface 235 includes at least one of a flat surface portion and a curved surface portion. The scale contacting portion 214 is a stopper for positioning the reflective scale 27 in a rotation axis direction of the operation ring 21.

As illustrated in FIG. 21, since the circumferential length of the rotational sliding portion 212A having the fixing preparation diameter is longer than the length L1 of the reflective scale 27, the rotational sliding portion 212A does not receive an expansion force from the reflective scale 27, and thereby the reflective scale 27 can be easily fixed to the rotational sliding portion 212A of the operation ring 21. The position (A) in FIG. 20 shows a position of the reflective scale 27 disposed on the rotational sliding portion 212A. From this state, a side surface of the reflective scale 27 is pushed in a direction of an arrow F in FIG. 20 (toward the contacting portions 211a) until the reflective scale 27 contacts the scale contacting portion 214A. When the reflective scale 27 is pushed, since the rotational sliding portion 212A and the convex portions 211a are connected by the slope surface 235, the reflective scale 27 is smoothly pushed into a position illustrated by (B) at which the reflective scale 27 contacts the convex portions 211a, and thereby the reflective scale 27 is fixed to the operation ring 21. The above-described method enables fixing the reflective scale 27 that generates expansion forces in the radial and circumferential directions is fixed to the inner circumference of the convex portions 211a.

In the present embodiment, it is desirable that a width W1 of the rotational sliding portion 212A in the rotational axis direction be set to be different from a width W2 of the reflective scale 27 in the same direction. When the width W1 is larger than the width W2 (that is\, W1>W2), a force indicated by an arrow F can be easily applied for pushing the reflective scale 27 from the position (A) to the position (B). On the other hand, when the width W1 is smaller than the width W2 (that is, W1<W2), the reflective scale 27 can be pushed in parallel from the position (A) to the position (B). In either case, it is easy to push the reflective scale 27.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167861, filed on Sep. 7, 2018 and Japanese Patent Application No. 2018-221833, filed on Nov. 28, 2018 which are hereby incorporated by reference herein in their entirety.

What is claimed is:

1. A rotation detection apparatus comprising:
an annular member;
a scale member having flexibility and being fixed to a circumferential portion of the annular member; and
a detector facing the scale member and configured to detect relative rotation between the scale member and the detector,
wherein:
the circumferential portion of the annular member includes multiple convex portions and multiple concave portions along a circumferential direction of the annular member;
the scale member is in contact with the multiple convex portions; and
both ends, in the circumferential direction, of the scale member are fixed to the circumferential portion.

2. The rotation detection apparatus according to claim 1, wherein the scale member is fixed to the circumferential portion with the scale member deformed inside each of the multiple concave portions.

3. The rotation detection apparatus according to claim 1, wherein the scale member is pressed against the multiple convex portions by an elastic force generated by the scale member.

4. The rotation detection apparatus according to claim 1, wherein the both ends of the scale member are in contact with each other in the circumferential direction.

5. The rotation detection apparatus according to claim 1, wherein a length of the scale member is longer than a length of a circle in contact with the multiple convex portions.

6. The rotation detection apparatus according to claim 1, wherein:
the circumferential portion includes a protruding portion that protrudes further than the multiple convex portions; and
the both ends of the scale member are in contact with the protruding portion in the circumferential direction.

7. The rotation detection apparatus according to claim 6, wherein a length of the scale member in the circumferential direction is longer than a length obtained by subtracting a length of the protruding portion in the circumferential direction from a length of a circle in contact with the multiple convex portions.

8. The rotation detection apparatus according to claim 1, wherein the both ends of the scale member are adhered to the circumferential portion.

9. The rotation detection apparatus according to claim 1, wherein:
the scale member has a pattern whose reflectance changes in the circumferential direction; and
the detector includes a light emitter configured to emit light toward the pattern and a light receiver configured to receive light from the pattern.

10. The rotation detection apparatus according to claim 9, wherein:
the reflectance of the pattern changes with a predetermined period in the circumferential direction;
the both ends of the scale member are in contact with each other in the circumferential direction; and
reflectances of the both ends are different from each other.

11. The rotation detection apparatus according to claim 9, wherein:
the reflectance of the pattern changes with a predetermined period in the circumferential direction;
the both ends of the scale member are in contact with each other so that the both ends of the scale member are fixed to the circumferential portion; and
reflectances of the both ends are the same as each other, and a length of each of the both ends in the circumferential direction is half of the predetermined period.

12. An operation apparatus comprising:
an operation member to be operated rotationally;
a rotation detection apparatus configured to detect rotation of the operation member; and a controller configured to control an operation based on the detected rotation, wherein the rotation detection apparatus comprises:
- a scale member having flexibility and being fixed to a circumferential portion of the operation member; and
- a detector facing the scale member and configured to detect relative rotation between the scale member and the detector, wherein:
- the circumferential portion of the operation member includes multiple convex portions and multiple concave portions along a circumferential direction of the operation member;
- the scale member is in contact with the multiple convex portions; and
- both ends, in the circumferential direction, of the scale member are fixed to the circumferential portion.

13. A rotation detection apparatus comprising:

an annular member;

a scale member having flexibility and being fixed to a circumferential portion of the annular member; and a detector facing the scale member and configured to detect relative rotation between the scale member and the detector, wherein:
- the circumferential portion of the annular member includes multiple convex portions in contact with the scale member and a circumferential surface arranged at a position different from those of the multiple convex portions in a direction of an axis of the annular member;
- a length of a circle in contact with the multiple convex portions is shorter than a longitudinal length of the scale member;
- a length of the circumferential surface along a circumferential direction of the annular member is not shorter than the longitudinal length of the scale member; and
- the multiple convex portions and the circumferential surface are smoothly connected to each other in the direction of the axis.

14. The rotation detection apparatus according to claim 13, wherein the annular member includes a slope formed between the multiple convex portions and the circumferential surface.

15. The rotation detection apparatus according to claim 14, wherein the slope includes at least one of a planar surface and a curved surface.

16. The rotation detection apparatus according to claim 13, wherein a length of the circumferential surface in the direction of the axis is longer than a length of the scale member in the direction of the axis.

17. The rotation detection apparatus according to claim 13, wherein a length of the circumferential surface in the direction of the axis is shorter than a length of the scale member in the direction of the axis.

18. The rotation detection apparatus according to claim 13, further comprising:

a fixed member to which the detector is fixed, wherein the circumferential surface is engaged with the fixed member to constitute a bearing for the annular member.

19. The rotation detection apparatus according to claim 13, wherein:

the scale member is fixed to the circumferential portion with the scale member deformed inside each of the multiple concave portions.

20. A lens apparatus comprising:

a movable optical element; and a rotation detection apparatus of claim 1 for moving the optical element.

21. A lens apparatus comprising:

a movable optical element; and a rotation detection apparatus of claim 13 for moving the optical element.

22. An image pickup apparatus comprising:

a lens apparatus of claim 20;

an image sensor configured to receive an image formed by the lens apparatus.

23. An image pickup apparatus comprising:

a lens apparatus of claim 21;

an image sensor configured to receive an image formed by the lens apparatus.

24. The image pickup apparatus according to claim 22, wherein the lens apparatus is an interchangeable lens apparatus.

25. The image pickup apparatus according to claim 23, wherein the lens apparatus is an interchangeable lens apparatus.

* * * * *